US012223777B2

(12) United States Patent
Kodaira et al.

(10) Patent No.: US 12,223,777 B2
(45) Date of Patent: Feb. 11, 2025

(54) DETERMINATION DEVICE, DETERMINATION METHOD, AND COMPUTER-READABLE RECORDING MEDIUM

(71) Applicant: HONDA MOTOR CO., LTD., Tokyo (JP)

(72) Inventors: Kazuhiro Kodaira, Saitama (JP); Takahira Kawata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 406 days.

(21) Appl. No.: 17/579,475

(22) Filed: Jan. 19, 2022

(65) Prior Publication Data

US 2022/0292884 A1 Sep. 15, 2022

(30) Foreign Application Priority Data

Mar. 12, 2021 (JP) ................................ 2021-040485

(51) Int. Cl.
*G07C 5/00* (2006.01)

(52) U.S. Cl.
CPC ............ *G07C 5/006* (2013.01); *G07C 5/008* (2013.01)

(58) Field of Classification Search
CPC ................................ G07C 5/006; G07C 5/008
USPC ........................................................ 701/32.1
See application file for complete search history.

(56) References Cited

U.S. PATENT DOCUMENTS

| | | | | |
|---|---|---|---|---|
| 8,731,766 | B2 * | 5/2014 | Artus | G06Q 10/06 702/182 |
| 8,731,767 | B2 * | 5/2014 | Paturle | B60C 11/04 701/31.4 |
| 9,286,735 | B1 * | 3/2016 | Ahn | G07C 5/0808 |
| 9,846,978 | B1 * | 12/2017 | Tseng | G07C 5/006 |
| 10,214,364 | B2 * | 2/2019 | Grathwol | G07C 3/00 |
| 10,495,169 | B2 * | 12/2019 | Antanaitis | B60T 17/221 |
| 10,964,130 | B1 * | 3/2021 | Dixit | G05B 23/0283 |
| 2002/0087578 | A1 * | 7/2002 | Vroman | B61L 27/57 |
| 2003/0114965 | A1 * | 6/2003 | Fiechter | G05B 23/024 714/E11.158 |
| 2011/0082621 | A1 * | 4/2011 | Berkobin | B60L 58/16 701/31.4 |
| 2015/0019065 | A1 * | 1/2015 | Bollapragada | B64F 5/40 701/29.1 |
| 2015/0149049 | A1 * | 5/2015 | Bewley | E02F 9/267 37/444 |

(Continued)

FOREIGN PATENT DOCUMENTS

JP 5259443 B2 8/2013

*Primary Examiner* — Kurt Philip Liethen
*Assistant Examiner* — John D Bailey

(57) ABSTRACT

A determination device may include an acquisition unit configured to acquire first degradation values that indicate respective degradation degrees of a plurality of components of a same type, and regard the respective first degradation values of the plurality of components as respective first usage values of a plurality of usage environments in which the plurality of components are used. The determination device may include a determination unit configured to determine, based on a target value that indicates a predetermined target degradation degree of the plurality of components, a first combination of the respective first degradation values of the plurality of components and the respective first usage values of the plurality of usage environments.

15 Claims, 10 Drawing Sheets

(56) References Cited

U.S. PATENT DOCUMENTS

| | | | | |
|---|---|---|---|---|
| 2016/0093116 | A1* | 3/2016 | Ahn | B60K 35/00<br>701/31.9 |
| 2016/0093119 | A1* | 3/2016 | Ahn | G07C 5/006<br>701/29.3 |
| 2016/0133070 | A1* | 5/2016 | Ikeda | G07C 5/0808<br>701/31.4 |
| 2016/0247329 | A1* | 8/2016 | Lavoie | B60C 11/00 |
| 2016/0275727 | A1* | 9/2016 | Kurimoto | H01M 10/4207 |
| 2017/0081997 | A1* | 3/2017 | Potyrailo | F01M 11/12 |
| 2017/0270720 | A1* | 9/2017 | Aydin | G05D 23/00 |
| 2018/0141534 | A1* | 5/2018 | Prehofer | B60T 17/228 |
| 2018/0141565 | A1* | 5/2018 | Petrak | G07C 5/0816 |
| 2018/0257653 | A1* | 9/2018 | Seaman | B60W 50/029 |
| 2018/0308292 | A1* | 10/2018 | Ganguli | G06Q 10/20 |
| 2018/0365911 | A1* | 12/2018 | Raviram | G07C 5/0825 |
| 2019/0035170 | A1* | 1/2019 | Dede | G07C 5/0808 |
| 2019/0084548 | A1* | 3/2019 | Ohazulike | F16D 66/00 |
| 2019/0172275 | A1* | 6/2019 | Elson | G07C 5/0808 |
| 2019/0266295 | A1* | 8/2019 | Masuda | G06Q 50/40 |
| 2019/0329786 | A1* | 10/2019 | Kimura | B60W 40/072 |
| 2019/0385385 | A1* | 12/2019 | Davidson | G07C 5/0808 |
| 2019/0385386 | A1* | 12/2019 | Davidson | G07C 5/0858 |
| 2019/0385387 | A1* | 12/2019 | Davidson | G07C 5/008 |
| 2020/0013237 | A1* | 1/2020 | Kanbe | G07C 5/006 |
| 2020/0031184 | A1* | 1/2020 | Ukegawa | G06Q 10/06315 |
| 2020/0043257 | A1* | 2/2020 | Venkiteswaran | G07C 5/085 |
| 2020/0102993 | A1* | 4/2020 | Antanaitis | B60T 17/22 |
| 2020/0148010 | A1* | 5/2020 | Oki | G06Q 10/00 |
| 2020/0160348 | A1* | 5/2020 | Osumi | G06Q 30/0278 |
| 2020/0270927 | A1* | 8/2020 | Bramauer | G07C 5/0808 |
| 2020/0334922 | A1* | 10/2020 | Johnston | G07C 5/0808 |
| 2020/0357193 | A1* | 11/2020 | Hickenbottom | G07C 5/008 |
| 2021/0049833 | A1* | 2/2021 | Bielby | G06N 3/063 |
| 2021/0049834 | A1* | 2/2021 | Kale | G07C 5/006 |
| 2021/0049839 | A1* | 2/2021 | Bielby | G07C 5/008 |
| 2021/0158255 | A1* | 5/2021 | Kaneichi | G06Q 10/06315 |
| 2022/0016939 | A1* | 1/2022 | Doraiswamy | G06N 3/084 |
| 2022/0058891 | A1* | 2/2022 | Ha | G07C 5/12 |
| 2022/0068053 | A1* | 3/2022 | Hinduja | B60W 50/0205 |
| 2022/0105926 | A1* | 4/2022 | Zhang | G08G 1/162 |
| 2022/0108567 | A1* | 4/2022 | Friese | B62J 45/414 |
| 2022/0130179 | A1* | 4/2022 | Kimura | G07C 5/085 |
| 2022/0139118 | A1* | 5/2022 | Zhang | G07C 5/0816<br>701/29.4 |
| 2022/0148342 | A1* | 5/2022 | Fagergren | B62D 15/0235 |

* cited by examiner

| INDEX C1 | | COMPONENT ID | | | | | | | | | |
|---|---|---|---|---|---|---|---|---|---|---|---|
| | | 1 | 2 | 3 | 4 | 5 | 6 | 7 | 8 | 9 | 10 |
| USER ID | 1 | | | | | | | | | | |
| | 2 | | | | | | | | | | |
| | 3 | | | | | | | | | | |
| | 4 | | | | | | | | | | |
| | 5 | | | | | | | | | | |
| | 6 | | | | | | | | | | |
| | 7 | | | | | | | | | | |
| | 8 | | | | | | | | | | |
| | 9 | | | | | | | | | | |
| | 10 | | | | | | | | | | |

*FIG.7*

| INDEX C2 | | COMPONENT ID | | | | | | | | | |
|---|---|---|---|---|---|---|---|---|---|---|---|
| | | 1 | 2 | 3 | 4 | 5 | 6 | 7 | 8 | 9 | 10 |
| USER ID | 1 | | | | | | | | | | |
| | 2 | | | | | | | | | | |
| | 3 | | | | | | | | | | |
| | 4 | | | | | | | | | | |
| | 5 | | | | | | | | | | |
| | 6 | | | | | | | | | | |
| | 7 | | | | | | | | | | |
| | 8 | | | | | | | | | | |
| | 9 | | | | | | | | | | |
| | 10 | | | | | | | | | | |

*FIG.8*

DETERMINATION DEVICE, DETERMINATION METHOD, AND COMPUTER-READABLE RECORDING MEDIUM

BACKGROUND

1. Technical Field

The contents of the following Japanese patent application are incorporated herein by reference:

NO. 2021-040485 filed in JP on Mar. 12, 2021.

The present invention relates to a determination device, a determination method, and a computer-readable recording medium.

2. Related Art

Patent document 1 discloses a management system configured to allocate in order a vehicle having a higher estimated degradation value to a management environment having a lower degradation tendency and a vehicle having a lower estimated degradation value to a management environment having a higher degradation tendency.

PRIOR ART DOCUMENT

Patent Document

Patent Document 1: Japanese Patent No. 5259443

BRIEF DESCRIPTION OF THE DRAWINGS

FIG. 7 shows a view for illustrating combinations of degradation values A1 based on an index C1 of each target component and user and usage values P1.

FIG. 8 shows a view for illustrating combinations of the degradation values A1 based on an index C2 of each target component and user and the usage values P1.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1:
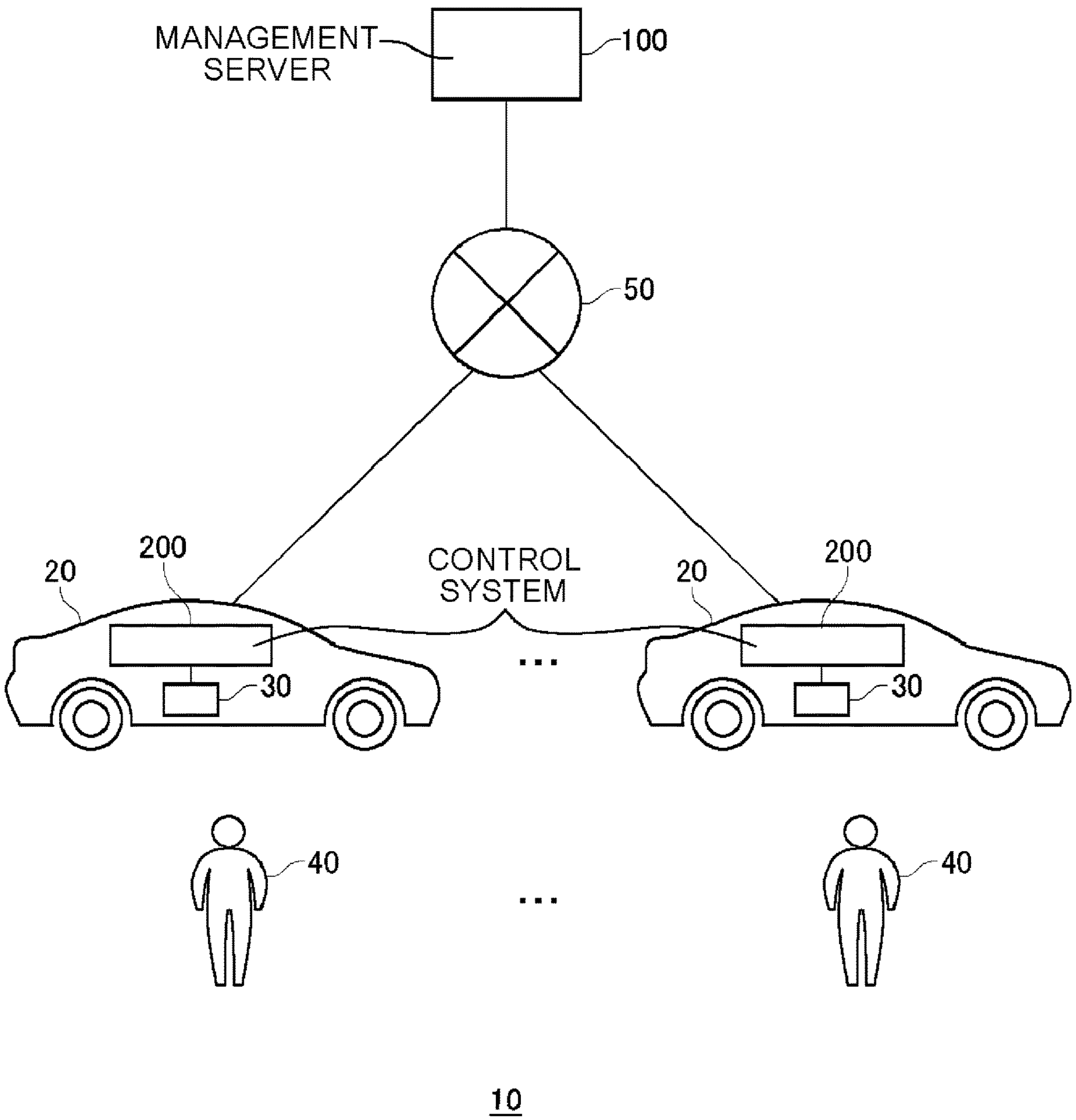
FIG. 1 shows a view of an overall configuration of a vehicle management system.

FIG. 1 shows a view of an overall configuration of a vehicle management system 10. The vehicle management system 10 includes a plurality of vehicles 20 and a management server 100. The vehicles 20 and the management server 100 are communicatively connected with each other via a communication network 50. The communication network 50 includes an IP network such as the Internet, a P2P network, a dedicated line including a VPN, a virtual network, a mobile communication network, or the like. The vehicle 20 includes a battery 30 and a control system 200.

The control system 200 is configured to control charge and discharge of the battery 30. The battery 30 is one example of a component mounted on the vehicle 20. The component may be an exchangeable consumable mounted on the vehicle 20. The control system 200 is configured to perform control of the vehicle 20, and communication between the vehicle 20 and the management server 100 via the communication network 50. The management server 100 is configured to perform management of the plurality of vehicles 20. For example, the vehicle 20 may be a vehicle managed by a company in the car leasing industry, the transportation industry, or the like.

A lifetime of a component such as the battery 30 mounted on the vehicle 20 varies depending on a usage manner of the vehicle 20 by the user 40 of the vehicle 20. However, it is desired to suppress variation of the lifetime of the component to extend the entire lifetime of the plurality of vehicles 20.

Therefore, the management server 100 is configured to periodically change combinations of the vehicles 20 or the components mounted on the vehicle 20 and the users 40 so as to extend the entire time that the components, such as the battery mounted on each of the plurality of vehicles 20, take to reach an end of a lifetime thereof. The management server 100 is configured to determine optimal combinations of target components of the vehicle 20 and the users 40, based on a degradation value that indicates a degradation degree of a component such as the battery mounted on the vehicle 20 and a usage value of the component depending on a usage manner of the user 40 owning the vehicle 20. The management server 100 is one example of a determination device. In the present embodiment, a component mounted on the vehicle is described as an example. However, the component may be a component mounted on a device other than the vehicle, as long as a degradation degree of the component changes depending on a usage manner of the user and a usage environment such as a place where the component is used.

Figure 2:
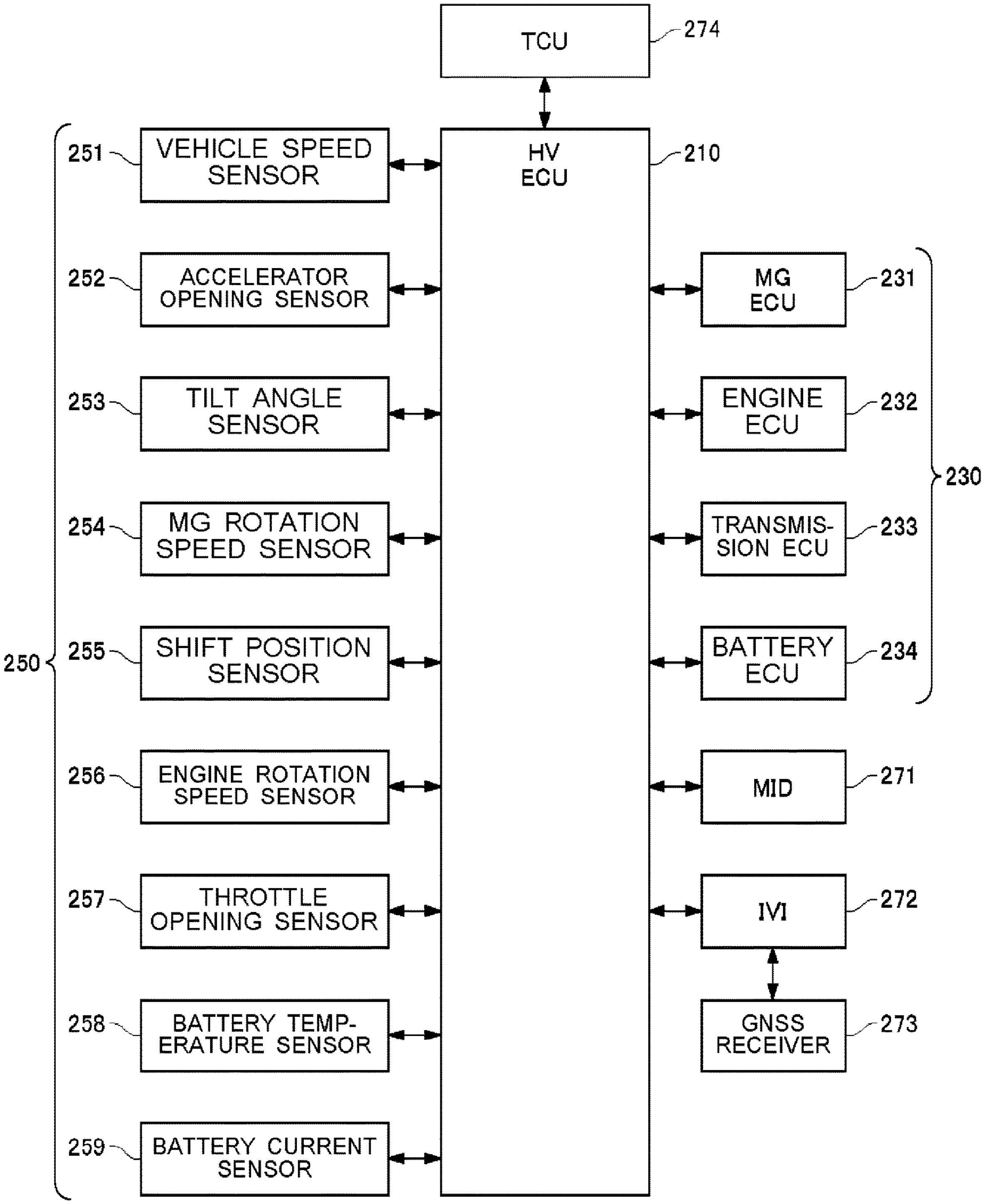
FIG. 2 shows a schematical view of a system configuration of a control system equipped on a vehicle.

FIG. 2 shows a schematical view of a system configuration of the control system 200 equipped in the vehicle 20. The control system 200 includes an HVECU 210, various types of ECUs 230, various types of sensors 250, an MID 271, an IVI 272, a GNSS receiver 273, and a TCU 274.

The HVECU 210 is a hybrid ECU (Electronic Control Unit) configured to control the vehicle 20. The HVECU 210 and the various types of ECUs 230 may be configured to include a so-called microcomputer consisting of a CPU, an ROM, an RAM, and an input/output interface, etc. The HVECU 210 is configured to perform a signal processing according to a program prestored in the ROM while utilizing a temporary storage function of the RAM.

The HVECU 210 is connected to the MID 271, the IVI 272, the TCU 274, and various types of ECUs 230, via an in-vehicle communication circuit. The HVECU 210 is configured to communicate with the MID 271, the IVI 272, the TCU 274, and various types of ECUs 230, via the in-vehicle communication circuit. The HVECU 210 is configured to collectively control the MID 271, the IVI 272, the TCU 274, and various types of ECUs 230, via the in-vehicle communication circuit. The in-vehicle communication circuit may be configured to include, for example, CAN (Controller Area Network), Ethernet (registered trademark), or the like.

The MID 271 is a multi-information display. The IVI 272 is an in-vehicle infotainment information appliance (IVI), for example. The MID 271 and the IVI 272 are connected to the HVECU 210 via an in-vehicle communication line. The MID 271 and the IVI 272 may function as a display control unit. The IVI 272 has a wireless LAN communication function. The IVI 272 is configured to determine a location of the vehicle 20 based on a signal received from a GNSS (Global Navigation Satellite System) satellite. The IVI 272 is configured to acquire location information of the vehicle 20 from the GNSS receiver 273. The IVI 272 is configured to output the location information acquired from the GNSS receiver 273 to the HVECU 210.

The TCU 274 is a telematics control unit. The TCU 274 is mainly responsible for mobile communication. The TCU 274 is configured to perform sending and receiving of data to and from the management server 100 based on control by the HVECU 210.

Various types of ECUs 230 include an MGECU 231, an engine ECU 232, a transmission ECU 233, and a battery ECU 234. The MGECU 231 is configured to control a driving motor generator mounted on the vehicle 20. The engine ECU 232 is configured to control an engine mounted on the vehicle 20. The transmission ECU 233 is configured to control a transmission mounted on the vehicle 20. The battery ECU 234 is configured to control a battery that is a high voltage battery mounted on the vehicle 20.

The HVECU 210 is configured to perform hybrid driving control over the motor generator via the MGECU 231 and the engine via the engine ECU 232. The HVECU 210 is configured to perform speed control of the transmission via the transmission ECU 233. The HVECU 210 is configured to perform charge and discharge control of the battery via the battery ECU 234.

Various types of sensors 250 include a vehicle speed sensor 251, an accelerator opening sensor 252, a tilt angle sensor 253, a MG rotation speed sensor 254, a shift position sensor 255, an engine rotation speed sensor 256, a throttle opening sensor 257, and a battery temperature sensor 258. Various types of sensors 250 may include other sensors.

The vehicle speed sensor 251 is configured to detect a vehicle speed of the vehicle 20. The accelerator opening sensor 252 is configured to detect an accelerator opening in accordance with an operation by a driver, i.e., an operation amount of an accelerator pedal. The tilt angle sensor 253 is configured to detect a tilt of the vehicle 20. The MG rotation speed sensor 254 is configured to detect a rotation speed of the motor generator. The shift position sensor 255 is configured to detect a shift position of a shift lever. The engine rotation speed sensor 256 is configured to detect a rotation speed of the engine. The throttle opening sensor 257 is configured to detect an opening of a throttle valve of the engine. The battery temperature sensor 258 is configured to detect a temperature of the battery. A battery current sensor 259 is configured to detect charging and discharging current of the battery.

The HVECU 210 is configured to set a required driving force, based on the vehicle speed detected by the vehicle speed sensor 251 and the accelerator opening detected by the accelerator opening sensor 252. The HVECU 210 is configured to judge whether the vehicle 20 is starting to move, based on the vehicle speed detected by the vehicle speed sensor 251. The HVECU 210 is configured to judge whether the vehicle 20 is on a uphill road or a downhill road, based on the tilt angle detected by the tilt angle sensor 253. The engine ECU 232 is configured to control output torque from the engine according to the set required driving force, based on a command from the HVECU 210. The MGECU 231 is configured to control output torque from the motor generator according to the set required driving force, based on a command from the HVECU 210. The transmission ECU 233 is configured to perform speed control of the transmission according to the set required driving force.

The battery ECU 234 is configured to control charge and discharge of the battery, based on battery information that indicates a state of the battery such as a terminal voltage of the battery, the charging and discharging current of the battery from the battery current sensor 259, and the battery temperature from the battery temperature sensor 258. The battery ECU 234 is configured to calculate a state of charge (SOC) based on an integrated value of the charging and discharging current of the battery.

In the present embodiment, a hybrid vehicle is described as an example of the vehicle 20. However, the vehicle 20 may be a vehicle having any type of drive system, such as an engine vehicle or an electric vehicle.

Figure 3:
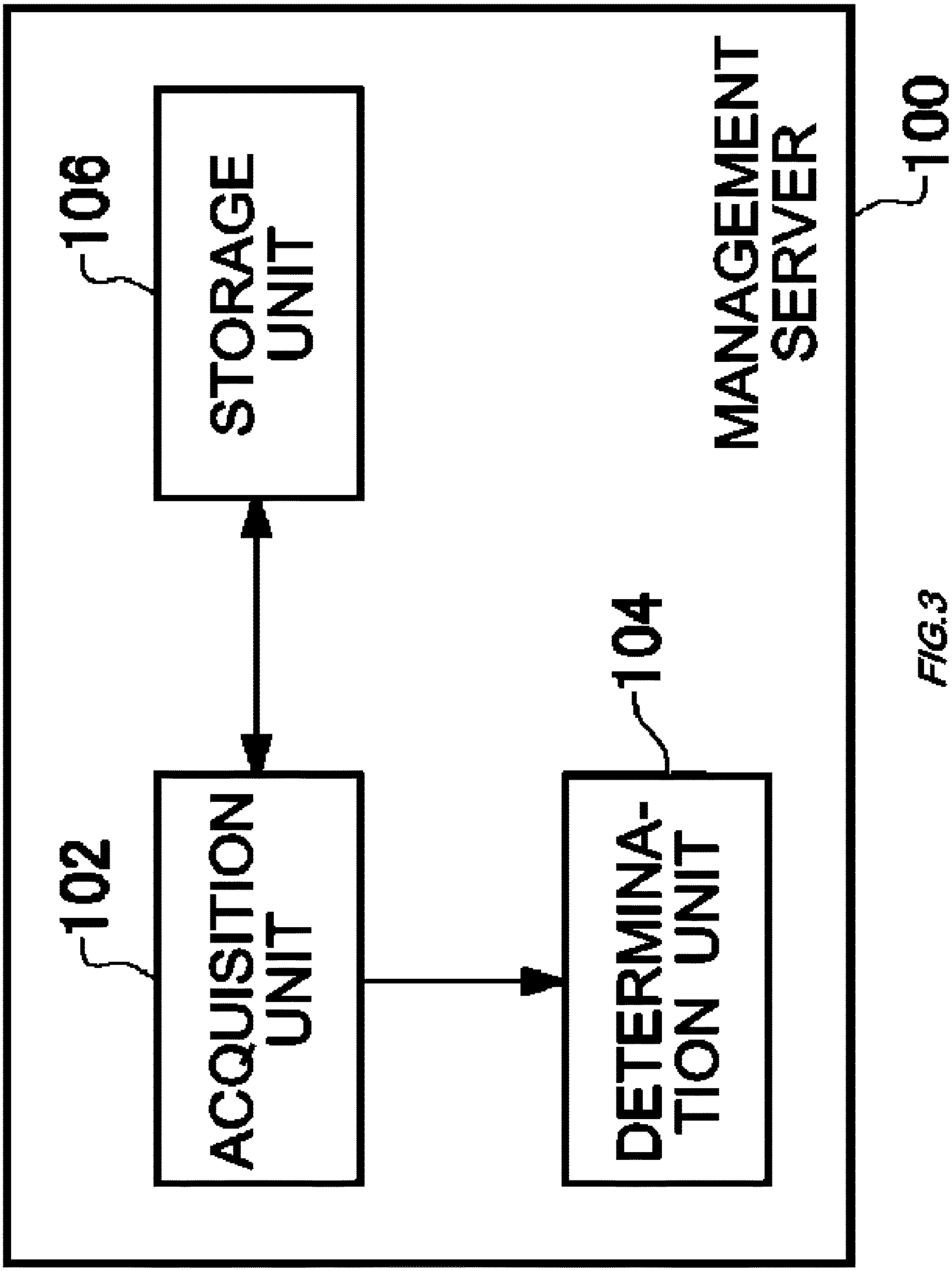
FIG. 3 shows a view of one example of a functional block of a management server.

FIG. 3 shows a view of one example of a functional block of the management server 100. The management server 100 includes an acquisition unit 102, a determination unit 104, and a storage unit 106.

Figure 4:
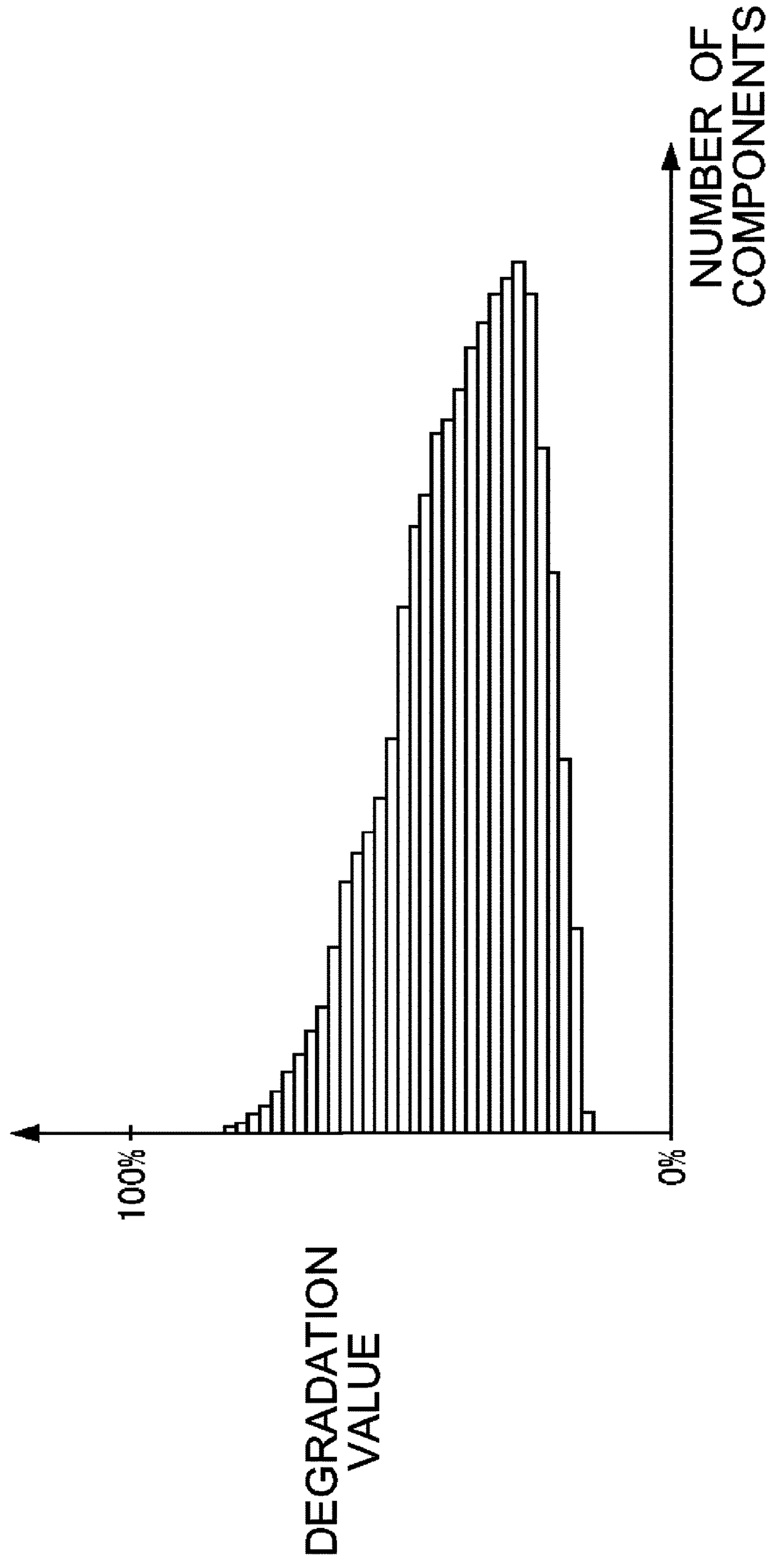
FIG. 4 shows a view of one example of a histogram illustrating a relationship between degradation values of components and a number of components having each degradation value.

The acquisition unit 102 is configured to acquire degradation values A1 that indicate respective degradation degrees of a plurality of components of a same type mounted on each of the plurality of vehicles 20. A degradation value A1 may indicate a consumption amount of a component. FIG. 4 shows one example of a histogram that indicates a relationship between degradation values A1 of respective components and a number of components having each degradation value A1.

The plurality of components of the same type may be components having the same function. The component may be a consumable that is consumed as the vehicle 20 travels. The component may be a consumable that is consumed in accordance with a travel distance of the vehicle 20. The degradation value A1 may be indicated in a percentage on a basis of a maximum degradation degree at which the component reaches an end of a lifetime thereof. When the degradation value A1 is 100%, it may indicate that the component has reached the end of the lifetime thereof. The degradation value A1 may be a value based on a predetermined index C1. The degradation value A1 may be a value based on a travel distance of the vehicle 20, for example. The degradation value A1 may be indicated in a percentage on a basis of a predetermined maximum travel distance of the vehicle 20 at which it is likely that a target component reaches an end of a lifetime thereof. In other words, the degradation value A1 may be indicated by "a current travel distance of the vehicle 20 (km)/a maximum travel distance (km) of the vehicle 20 at which it is likely that a target component reaches an end of a lifetime thereof×100". For example, if the maximum travel distance of the vehicle 20 at which it is likely that the component reaches the end of a lifetime thereof is 240,000 km and the current travel distance of the vehicle 20 is 24,000 km, then the degradation value A1 of the component may be 10%.

In a case where the component is the battery 30, the degradation value A1 may be a value calculated by using, as an index, the battery information such as the terminal voltage of the battery or resistance in the battery. The acquisition unit 102 may acquire the degradation value A1 of the battery from the vehicle 20. The acquisition unit 102 may acquire the degradation value A1 by calculating the degradation value A1 of the battery according to a predetermined algorithm based on the battery information provided from the vehicle 20. The vehicle 20 may calculate the degradation value A1 of the component according the predetermined algorithm based on various types of parameters detected by the various types of sensors 250. The acquisition unit 102 may acquire a measured value A1 by calculating the degradation value A1 of the component according to the predetermined algorithm based on various types of parameters detected by the various types of sensors 250.

The acquisition unit 102 may regard respective degradation values A1 of the plurality of components as respective usage values P1 in a plurality of usage environments in which the plurality of components are used. The acquisition unit 102 may regard respective degradation values A1 of the plurality of components as respective usage values P1 of a plurality of users using each of the plurality of components. The acquisition unit 102 may regard respective degradation values A1 of the plurality of components as usage values P1 that indicate respective future degradation degrees of the plurality of components when each of the plurality of components is used by each of the plurality of users. For example, the usage environment may be a user of the vehicle 20 or an owner of the vehicle 20.

The acquisition unit 102 may regard the degradation value A1 of the component during a predetermined time period W1 from a past timepoint to a current timepoint as the usage value P1 of the user of the component during a predetermined time period W2 (W1=W2) from the current timepoint to a future timepoint. For example, the acquisition unit 102 may regard the degradation value A1 of the component during six years from a past timepoint to a current timepoint as the usage value P1 of the user of the component during six years from the current timepoint to a future timepoint.

Figure 5:
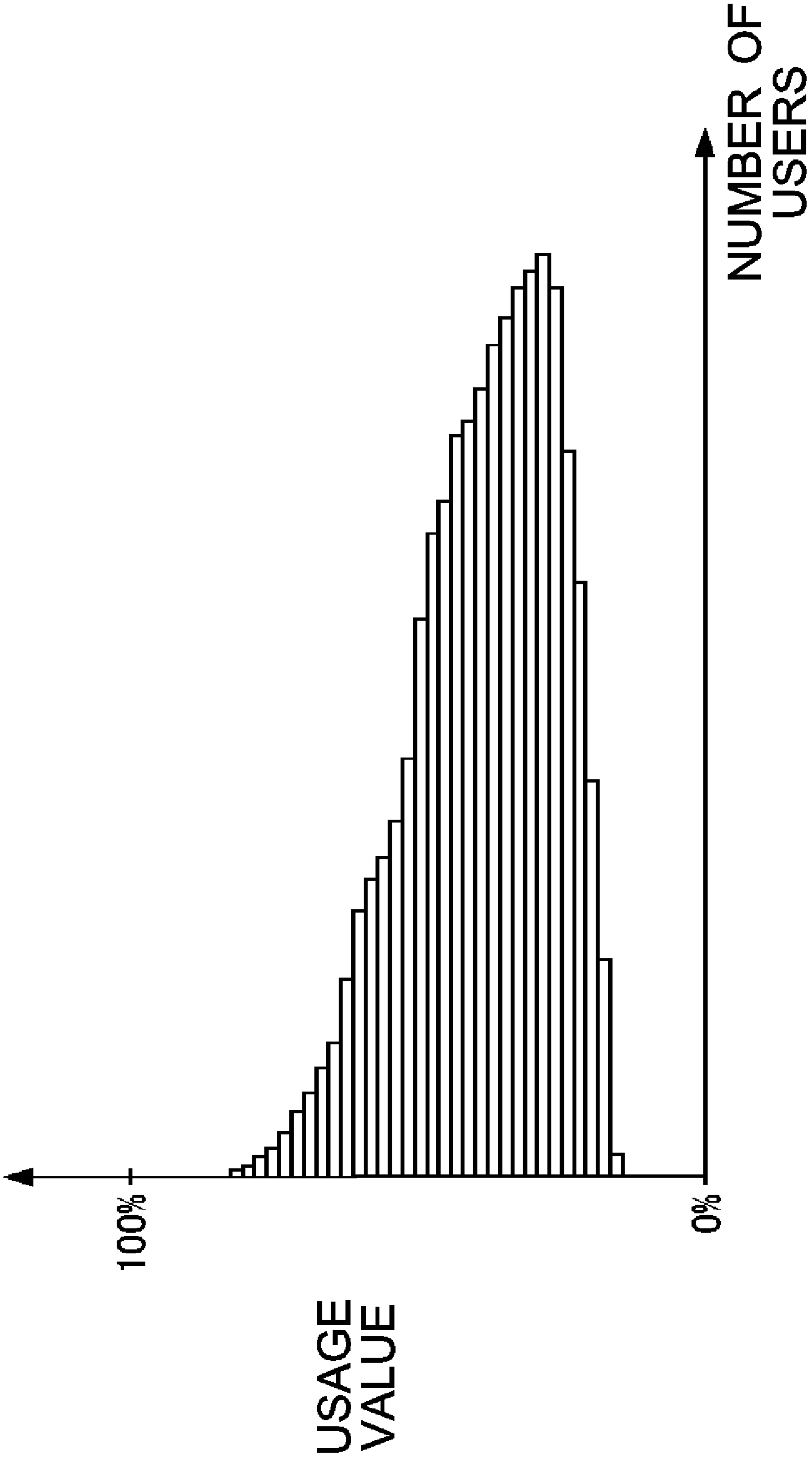
FIG. 5 shows a view of one example of a histogram illustrating a relationship between usage values of users and a number of users having each usage value.

FIG. 5 shows one example of a histogram illustrating a relationship between respective usage values P1 of the users and a number of users having each usage value P1. Because the degradation values A1 are regarded as the usage values P1, the histogram shown in FIG. 5 and the histogram shown in FIG. 4 match. In other words, the total number of components and the total number of users match.

Here, it is conceivable that the acquisition unit 102 is configured to estimate a usage value P1 according to a predetermined algorithm from a past usage condition of the vehicle 20, the degradation degree of the component or the like based on various types of parameters detected by the various types of sensors 250. However, estimation accuracy may vary, and in some cases the component may reach an end of a lifetime thereof before a planned time period elapses. In other words, the component can fail. Therefore, in the present embodiment, the acquisition unit 102 is configured to regard a past degradation value A1 directly as a future usage value P1.

The acquisition unit 102 is configured to store, in the storage unit 106, a degradation value A1 acquired from each vehicle 20 in association with a component ID of the component mounted on the vehicle 20 and a usage value P1 in association with a user ID of the user of the vehicle 20.

The determination unit 104 is configured to determine optimal combinations of respective degradation values A1 of the components and respective usage values P1 of the users of the component, based on a target value G that indicates a predetermined target degradation degree of the plurality of components. The determination unit 104 may determine, as the optimal combinations, combinations of respective degradation values A1 of the plurality of components and respective usage value P1 of the plurality of users with a smallest number of sums of the degradation values A1 and the usage values P1 exceeding an upper limit value H1 that indicates a maximum degradation degree at which the plurality of components reach an end of a lifetime thereof.

The determination unit 104 may calculate a sum T1 of a degradation value A1 and a usage value P1 for all combinations of each of the plurality of components and each of the plurality of users, and determine from the all combinations, as the optimal combinations, combinations of respective components from the plurality of components and respective users from the plurality of users with a smallest number of sums T1 of the degradation values A1 and the usage values P1 exceeding the upper limit value H1.

The determination unit 104 may perform a first process of determining whether respective degradation values A1 of the plurality of components exceed the target value G that indicates a future target degradation degree. The target value G may be a degradation value that indicates a target degradation degree of a component at a future predetermined timepoint. For example, the target value G may be a degradation value that indicates a target degradation degree of the component after six years. Further, the determination unit 104 may perform a second process of choosing, in order, for each component of the plurality of components the degradation value A1 of which exceeds the target value G, users by whom each of the sums T1 does not exceed the upper limit value H1 and an absolute value of a difference between each of the sums T1 and the target value G is smallest. In addition, the determination unit 104 may perform a third process of choosing, in order, for each component of the plurality of components the degradation value A1 of which is equal to or lower than the target value G, users by whom each of the sums T1 does not exceed the upper limit value H1 and an absolute value of a difference between each of the sums T1 and the target value G is smallest, from users among the plurality of users who are not chosen at the second process. The determination unit 104 may determine optimal combinations by performing the first process, the second process, and the third process.

As the third process, the determination unit 104 may choose, in order, combinations by which each of the sums T1 does not exceed the upper limit value H1 and an absolute value of a difference between each of the sums T1 and the target value G is smallest, from combinations by which each of the sums T1 exceeds the target value G among combinations of respective components the degradation value A1 of which is equal to or lower than the target value G and users from the plurality of users who are not chosen at the second process. Thereafter, the determination unit 104 may perform a process of choosing, in order, combinations by which each of the sums T1 does not exceed the upper limit value H1 and an absolute value of a difference between each of the sums T1 and the target value G is smallest, from combinations by which each of the sums T1 is equal to or lower than the target value G among combinations of respective components the degradation value A1 of which is equal to or lower than the target value G and users from the plurality of users who are not chosen at the second process.

A number of the sums T1 of the degradation values A1 and the usage values P1 exceeding the upper limit value H1 changes according to a magnitude of the target value G. An optimal target value G varies according to a distribution of degradation values A1 of the plurality of components. Therefore, the determination unit 104 may further perform the first process, the second process, and the third process in accordance with a plurality of target values G having different values, and determine, as optimal combinations, combinations of respective components from the plurality of components and respective users from the plurality of users in accordance with the target value G with a smallest number of the sums T1 exceeding the upper limit value H1 is smallest, among combinations of each of the plurality of components and each of the plurality of users in accordance with the plurality of target values G. The determination unit 104 may perform the first process, the second process, and the third process in accordance with integral values from 1% to 100% as the plurality of target values G, i.e., 100 target values G. The determination unit 104 may perform the first process, the second process, and the third process in accordance with integral values from 50% to 100% or from 30% to 100%.

For example, the degradation value A1 is a value calculated using a travel distance of the vehicle 20 as the index C1. However, the index for calculating the degradation value that indicates the degradation degree of the component may be chosen from various types of indices. Then, the degradation value that indicates the degradation degree of the component may vary according to the difference between the indices. Therefore, the determination unit 104 may determine, as optimal combinations, combinations of components and users by which each of the sums of the degradation values calculated using various types of indices and the usage values does not exceed the upper limit value.

The acquisition unit 102 may further acquire degradation values A2 that indicate respective degradation degrees of the components based on an index C2 that is different from the index C1 for each of the plurality of components. The acquisition unit 102 may regard respective degradation values A2 of the plurality of components as respective usage values P2 based on the index C2 in a plurality of usage environments in which the plurality of components are used. If the component is the battery 30, the index C2 may be a terminal voltage of the battery 30. The index may be an index based on an environment where the vehicle 20 is present. The index may be a weather condition such as temperature or humidity in a region where the vehicle 20 is present. The index may be a characteristic of the region where the vehicle 20 is present which affects the lifetime of each component mounted on the vehicle 20, such as a salt damaged region, a cold weather region, or the like. If the component is composed of a plurality of constituent elements, the index may be an index for each constituent element. For example, the component may be a drive unit. In this case, the index may be an index for each of a plurality of gears constituting the drive unit such as a transmission. In other words, the acquisition unit 102 may acquire respective degradation values calculated according to a predetermined algorithm based on a travel distance or the like for each gear. For example, if the index is different for each constituent element, the degradation value that indicates the degradation degree for each component may differ. For example, even if the sum T1 of the degradation value A1 and the usage value P1 based on the first index C1 does not exceed an upper limit value TH1, a sum T2 of the degradation value A2 and the usage value P2 based on the second index C2 may exceed an upper limit value H2. In this case, if combinations of the components and the users are determined based only on the first index C1, the components can degrade faster than expected, resulting in failure of the components. Therefore, the determination unit 104 may determine, as optimal combinations, combinations of the components and the users by which respective sums T based on the plurality of indices does not exceed respective threshold values TH. This can reliably prevent a component from degrading faster than expected, resulting in failure.

The determination unit 104 may determine optimal combinations of the components and the users based further on the degradation value A2 and the usage value P2 in addition to the degradation value A1, the usage value P1, and the target value G. The determination unit 104 may determine tentative optimal combinations of each of the plurality of components and each of the plurality of users by performing the first process, the second process, and the third process. Further, the determination unit 104 may finally determine the optimal combinations by further repeating the first process, the second process, and the third process, without determining, as the optimal combinations, combinations of the components and the users by which each of the sums T2 of the degradation values A2 and the usage values P2 exceeds the upper limit value H2 that indicates a maximum degradation degree of the component that are tolerable based on the index C2 of the plurality of component, among combinations of components and users in the tentative optimal combinations.

Figure 6A:
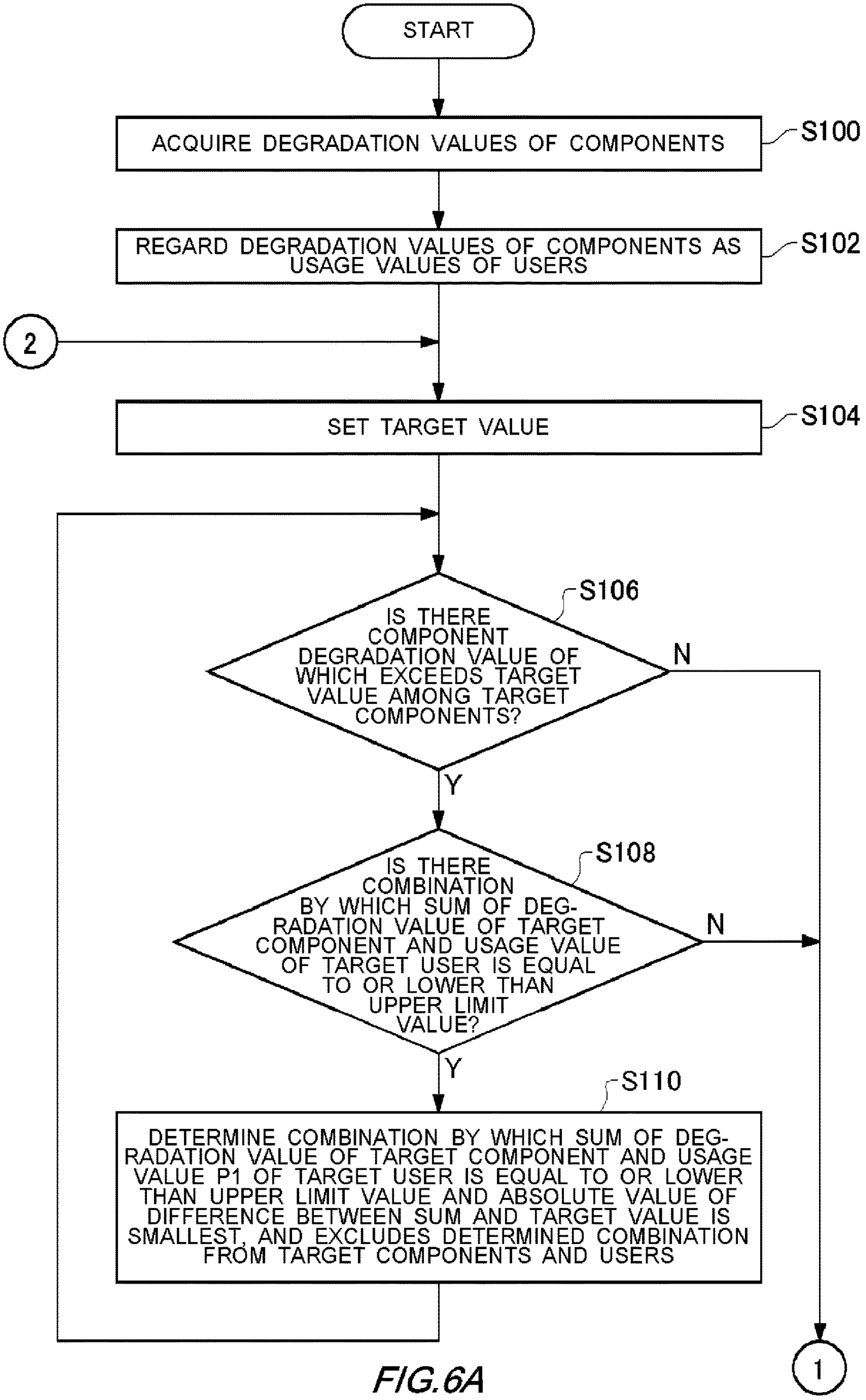
FIG. 6A shows a flowchart illustrating one example of a procedure of determining optimal combinations of components and users by the management server.
Figure 6B:
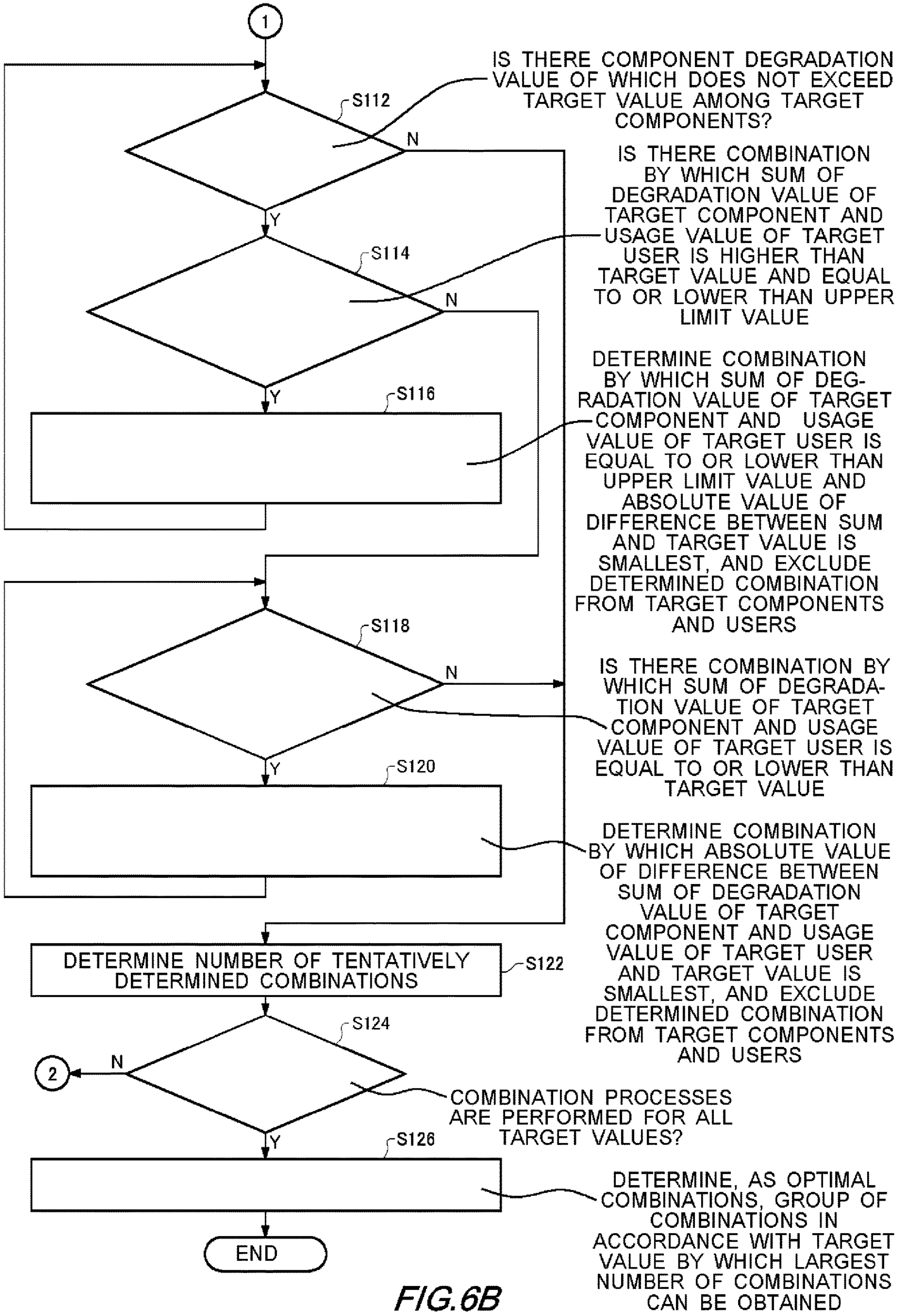
FIG. 6B shows a flowchart illustrating one example of a procedure of determining the optimal combinations of the components and the users by the management server.

FIG. 6A and FIG. 6B is a flowchart illustrating one example of a procedure of determining optimal combinations of the components and the users by the management server 100.

The acquisition unit 102 acquires degradation values A1 based on the index C1 of the components of the same type mounted on each of the plurality of vehicles 20 (S100). The acquisition unit 102 may acquire degradation values A1 that indicate respective degradation degrees of target components of the plurality of vehicles 20. The acquisition unit 102 may acquire degradation values A1 calculated by a travel distance of each of the plurality of vehicles 20 (km)/a maximum travel distance as a predetermined lifetime travel distance (km)×100.

The acquisition unit 102 regards respective degradation values A1 of the plurality of components as respective usage values P1 of the plurality of users corresponding to usage of each of the plurality of components (S102). The determination unit 104 sets target values G. The determination unit 104 may sequentially set the target values G by decreasing a highest target value G of 100% by 1%.

The determination unit 104 judges whether there exists a component the degradation value A1 of which exceeds the target value G among target components to be combined (S106).

If there exists a component the degradation value A1 of which exceeds the target value G, the determination unit 104 calculates a sum T1 of the degradation value A1 and the usage value P1 for all combinations of respective degradation values A1 of target components and respective usage values P1 of target users. For example, if a number of components is 10 and a number of users is 10, as shown in FIG. 7, the determination unit 104 calculates 10×10 respective sums T1. The determination unit 104 judges whether there exists a combination by which the sum T1 of the degradation value A1 of a target component and the usage value P1 of a target user is equal to or lower than the upper limit value H1, from combinations of the target components the degradation value A1 of which exceeds the target value G and the users (S108).

If there exists a combination by which the sum T1 of the degradation value A1 of the target component and the usage value P1 of the target user is equal to or lower than the upper limit value H1, the determination unit 104 determines a combination by which the sum T1 of the degradation value A1 of the target component and the usage value P1 of the target user is equal to or lower than the upper limit value H1 and an absolute value of a difference between the sum T1 and the target value G is smallest, tentatively determines the determined combination as one of the optimal combinations, and excludes the determined combination from the target components and the target users (S110).

The determination unit 104 calculates the sum T1 of the degradation value A1 and the usage value P1 for all combinations of the rest of the target components and the rest of the target users. Because one combination is excluded, the determination unit 104 excludes, for example, a combination of a component ID:3 and a user ID:7 from 10×10 respective sums T1 as shown in FIG. 7 and calculates 9×9 respective sums T1. The determination unit 104 repeats Step S106 to Step S110 until there exists no component the degradation value A1 of which exceeds the target value G among the target components to be combined and there exists no combination by which the sum T1 of the degradation value A1 of the target component and the usage value P1 of the target user is equal to or lower than the upper limit value H1.

When Step S106 to Step S110 ends, the determination unit 104 judges whether there exists a component the degradation value A1 of which does not exceed the target value G among the target components (S112). If there exists a component the degradation value A1 of which does not exceed the target value G among the target components, the determination unit 104 calculates the sum T1 of the degradation value A1 and the usage value P1 for all combinations of the rest of the target components and the rest of the target users.

Next, the determination unit 104 judges whether there exists a combination by which the sum T1 of the degradation value A1 of the target component and the usage value P1 of the target user is higher than the target value G and equal to or lower than the upper limit value H1 (S114). If there exists a combination by which the sum T1 is higher than the target value G and equal to or lower than the upper limit value H1, the determination unit 104 determines, from combinations by which the sum T1 is higher than the target value G and equal to or lower than the upper limit value H1, a combination by which an absolute value of a difference between the sum T1 and the target value G 1 is smallest, tentatively determines the determined combination as one of the optimal combinations, and excludes the determined combination from the target components and the target users (S116).

The determination unit 104 calculates anew the sum T1 of the degradation value A1 and the usage value P1 for all combinations of the rest of the target components and the rest of the target users. The determination unit 104 repeats Step S112 to Step S116 until there exists no combination in the target components to be combined by which the sum T1 is higher than the target value G and equal to or lower than the upper limit value H1.

When Step S112 to Step S116 ends, the determination unit 104 judges whether there exists a combination in the target components to be combined by which the sum T1 is equal to or lower than the target value G (S118). If there exists a combination by which the sum T1 is equal to or lower than the target value G, the determination unit 104 determines a combination by which an absolute value of a difference between the sum T1 and the target value G is smallest, tentatively determines the determined combination as one of the optimal combinations, and excludes the determined combination from the target components and the target users (S120). The determination unit 104 repeats Step S118 to Step S120 until there exists no component in the target components to be combined the degradation value A1 of which is equal to or lower than the target value G.

When Step S118 to Step S120 ends, the determination unit 104 determines a number of tentatively determined combinations (S122). Next, the determination unit 104 judges whether the combination processes of Step S104 to Step S120 are performed in accordance with all preset target values G (S124). If the combination processes of Step S104 to Step S120 are not performed in accordance with all preset target value G, the determination unit 104 repeats the combination processes of Step S104 to Step S120.

If the combination processes of Step S104 to Step S120 are performed in accordance with all preset target value G, the determination unit 104 determines, as optimal combinations, a group of combinations in accordance with the target value G by which a largest number of combinations can be obtained (S126).

As described above, with the management server 100 according to the present embodiment, optimal combinations of the vehicles 20 or the components mounted on the vehicles 20 and the users 40 can be determined so as to extend the entire time the components such as the battery mounted on each of the plurality of vehicles 20 take to reach an end of a lifetime thereof.

Described above is an example where optimal combinations of the components and the users are determined by using the degradation values A1 based on the index C1.

Described below is a case where optimal combinations of the components and the users are determined considering, in addition, degradation value A2 of the components based on the index C2 that is different from the index C1 for each of the plurality of components. In this case, the determination unit 104 calculates the sum T2 of the degradation value A2 and the usage value P2 for all combinations of degradation values A2 of the components based on the index C2 and the usage values P2 of the users, as shown in FIG. 8. At step S110, for example, for a combination by which the sum T1 of the degradation value A1 of the target component and the usage value P1 of the target user is equal to or lower than the upper limit value H1 and an absolute value of a difference between the sum T1 and the target value G is smallest, the determination unit 104 judges whether the sum T2 of the degradation value A2 and the usage value P2 exceeds the upper limit value H2. Then, when the sum T2 of the degradation value A2 and the usage value P2 does not exceed the upper limit value H2, the determination unit 104 tentatively determines the combination as one of the optimal combinations, and excludes the determined combination from the target components and the target users. Similarly, at Step S116 and Step S120, if the sum T2 of the degradation value A2 and the usage value P2 does not exceed the upper limit value H2, the determination unit 104 tentatively determines the combination as one of the optimal combinations and excludes the determined combination from the target components and the target users.

The determination unit 104 calculates the sum T1 of the degradation value A1 and the usage value P1 for all combinations of respective degradation values A1 of the target components based on the index C1 and respective usage values P1 of the target users. Further, the determination unit 104 calculates the sum T2 of the degradation value A2 and the usage value P2 for all combinations of respective degradation values A2 of the target components based on the index C2 and respective usage values P2 of the target users. The determination unit 104 performs the first process regarding the index C1 and the index C2. Then, the determination unit 104 tentatively determine, as one of the optimal combinations, a combination by which the sum T1 based on the index C1 is equal to or lower than the upper limit value H1 and the sum T2 based on the index C2 is equal to or lower than the upper limit value H2 and an absolute value of a difference between the sum and the target value is smallest, and excludes the tentatively determined combination from the target components and the target users.

After performing the first process until there exists no target combination, the determination unit 104 performs the second process regarding the index C1 and the index C2. Then, the determination unit 104 tentatively determine, as one of the optimal combinations, a combination by which the sum T1 based on the index C1 is equal to or lower than the upper limit value H1 and the sum T2 based on the index C2 is equal to or lower than the upper limit value H2, and the absolute value of the difference between the sum and the target value is smallest, and excludes the tentatively determined combination from the target components and the target users. After performing the second process until there exists no target combination, the determination unit 104 performs the third process regarding the index C1 and the index C2. The determination unit 104 tentatively determine, as one of the optimal combinations, a combination by which the sum T1 based on the index C1 is equal to or lower than the upper limit value H1 and the sum T2 based on the index C2 is equal to or lower than the upper limit value H2, and the absolute value of the difference between the sum and the target value is smallest, and excludes the combination from the target components and the target users. The determination unit 104 performs combined processes of the first process, the second process, and the third process in accordance with all preset target values G, and determines, as optimal combinations, a group of combinations in accordance with the target value G by which a largest number of combinations can be obtained.

In this manner, by determining optimal combinations of the components and the users considering the degradation degree based on a plurality of indices, the components can be prevented from failing due to the lifetime of the components being shorter than expected and variation of the lifetime of the components can be suppressed so as to extend the entire lifetime of the plurality of vehicles 20.

Figure 9:
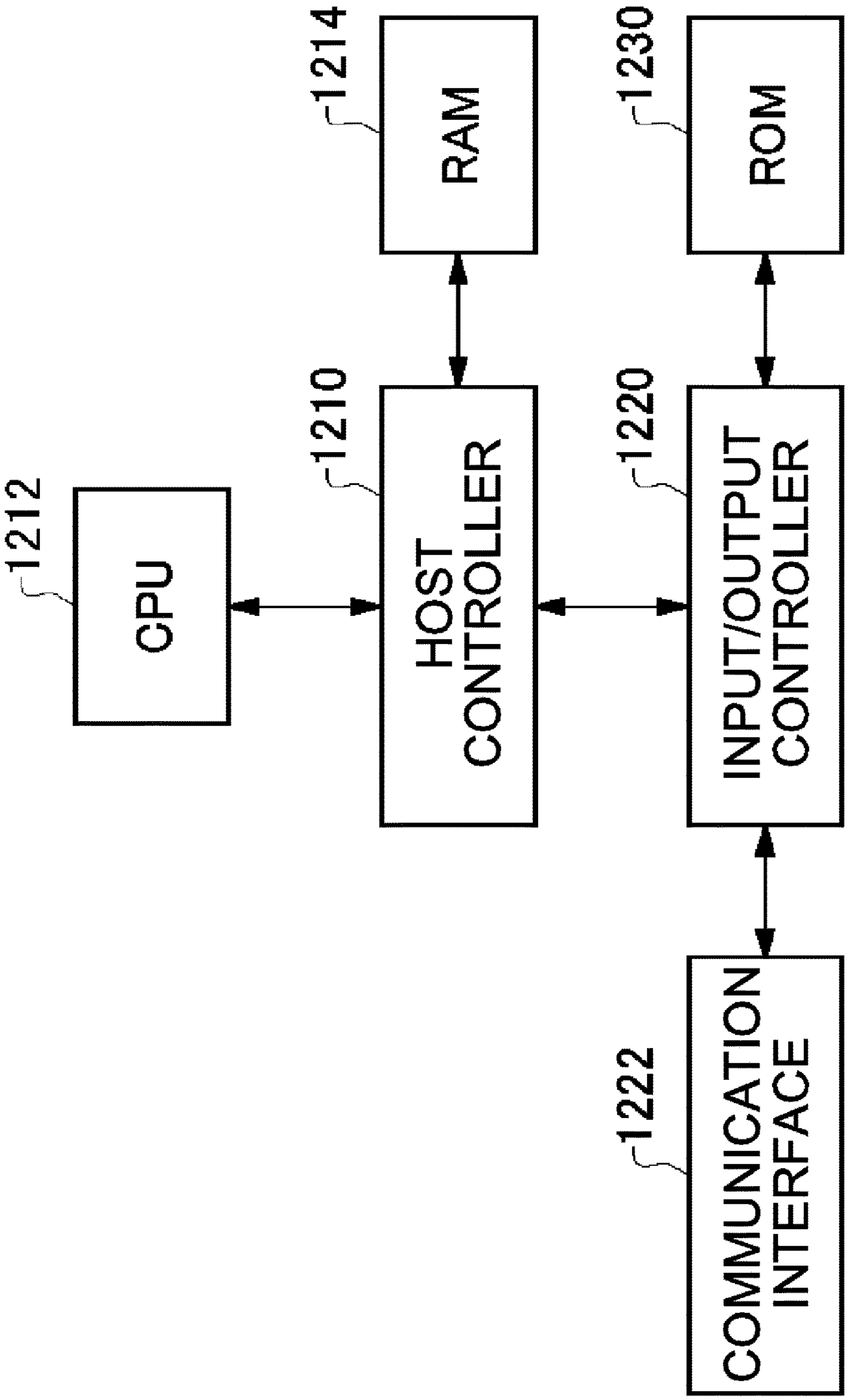
FIG. 9 shows a view illustrating one example of a hardware configuration.

FIG. 9 shows one example of a computer 1200 in which a plurality of aspects of the present invention may be entirely or partially embodied. A program installed in the computer 1200 can cause the computer 1200 to function as an operation associated with a device according to embodiments of the present invention or one or more "units" of the device. Or, the program can cause the computer 1200 to execute the operation or the one or more "units". The program can cause the computer 1200 to execute a process according to embodiments of the present invention or a step of the process. Such program may be performed by the CPU 1212 in order to cause the computer 1200 to execute a specific operation associated with some or all of the flowcharts and block diagrams described in the specification.

The computer 1200 according to the present embodiment includes a CPU 1212 and an RAM 1214. The CPU 1212 and the RAM 1214 are connected with each other by a host controller 1210. The computer 1200 also includes a communication interface 1222 and an input/output unit. The communication interface 1222 and the input/output unit are connected with the host controller 1210 via an input/output controller 1220. The computer 1200 also includes an ROM 1230. The CPU 1212 is configured to operate according to a program stored in the ROM 1230 and the RAM 1214 and thereby control each unit.

The communication interface 1222 is configured to communicate with other electronic devices via a network. A hard disk drive may store a program and data to be used by the CPU 1212 in the computer 1200. The ROM 1230 is configured to store therein a boot program or the like that will be executed by the computer 1200 upon activation and/or a program depending on a hardware of the computer 1200. A program is provided via a computer-readable recording medium such as a CD-ROM, a USB memory, or an IC card, or via a network. The program is installed in the RAM 1214 or the ROM 1230, which are examples of the computer-readable recording medium, and is executed by the CPU 1212. An information processing written in these programs is read by the computer 1200, and provides cooperation between the programs and the various types of hardware resources described above. A device or a method may be configured by implementing an operation or a processing of information according to usage of the computer 1200.

For example, when communication is performed between the computer 1200 and an external device, the CPU 1212 may execute a communication program loaded in the RAM 1214, and instruct the communication interface 1222 to execute a communication processing based on a processing written in the communication program. The communication interface 1222 is configured, under control of the CPU 1212, to read transmission data stored in a sending buffer region provided in a recording medium such as the RAM 1214 or the USB memory, and send the read transmission data to a network, or write the reception data received from the network in a receiving buffer region or the like provided on the recording medium.

In addition, all or necessary parts of a file or a database stored in an external recording medium such as the USB memory or the like are read into the RAM 1214 so that CPU 1212 may perform variety types of processes on data on the RAM 1214. The CPU 1212 may be configured to write back the processed data to the external recording medium.

Various types of information, such as various types of programs, data, tables, and databases, may be stored in the recording medium to undergo an information processing. The CPU 1212 may also be configured to execute various types of processings on the data read from the RAM 1214, which includes various types of operations, processings of information, condition judging, conditional branching, unconditional branching, search/replacement of information or the like described in the present disclosure and designated by an instruction sequence of programs, and to write the result back to the RAM 1214. The CPU 1212 may also be configured to search for information in a file, a database, etc., in the recording medium. For example, when a plurality of entries, each having an attribute value of a first attribute associated with an attribute value of a second attribute, are stored in the recording medium, the CPU 1212 may search for an entry, whose attribute value of the first attribute is designated, that matches with the condition from among the plurality of entries, and read the attribute value of the second attribute stored in the entry, thereby obtaining the attribute value of the second attribute associated with the first attribute satisfying the predetermined condition.

The program or software module described above may be stored in the computer-readable storage medium on the computer 1200 or near the computer 1200. Also, a recording medium such as a hard disk or an RAM provided in a server system connected to a dedicated communication network or Internet can be used as the computer-readable storage medium, and thereby provide the program to the computer 1200 via the network.

The computer-readable medium may include any tangible device that can store an instruction to be executed by an appropriate device. As a result, the computer-readable medium having an instruction stored thereon includes a product including an instruction that can be executed in order to implement a means for executing an operation designated in the flowcharts or block diagrams. Examples of the computer-readable medium may include an electronic storage medium, a magnetic storage medium, an optical storage medium, an electromagnetic storage medium, a semiconductor storage medium, or the like. More specific examples of the computer-readable medium may include a floppy (registered trademark) disk, a diskette, a hard disk, a random access memory (RAM), a read only memory (ROM), an erasable programmable read only memory (EPROM or Flash memory), an electrically erasable programmable read only memory (EEPROM), a static random access memory (SRAM), a compact disc read only memory (CD-ROM), a digital versatile disk (DVD), a BLU-RAY (registered trademark) disc, a memory stick, an integrated circuit card, etc.

The computer-readable instruction may include any of a source code or an object code written in any combination of one or more programming languages. The source code or the object code includes a conventional procedural programming language. The conventional procedural programming language may be an assembler instruction, an instruction set architecture (ISA) instruction, a machine instruction, a machine dependent instruction, a microcode, a firmware instruction, a state setting data, or an object oriented programming language such as Smalltalk (registered trademark), JAVA (registered trademark), C++ or the like, and a "C" programming language or a similar programming language. The computer-readable instruction may be provided locally or via a local area network (LAN), a wide area network (WAN) such as Internet to a general-purpose computer, a special-purpose computer, or a processor or a programmable circuitry of another programmable data processing device. The processor or the programmable circuitry may execute a computer-readable instruction in order to implement means for executing an operation designated in the flowcharts or block diagrams. Examples of processors include computer processors, processing units, microprocessors, digital signal processors, controllers, microcontrollers, or the like.

While the embodiments of the present invention have been described, the technical scope of the invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the invention.

It should be noted that the operations, procedures, steps, and stages of each process performed by a device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: vehicle management system
20: vehicle
30: battery
40: user
50: communication network
100: management server
102: acquisition unit
104: determination unit
106: storage unit
200: control system
210: HVECU
230: ECU
231: MGECU
232: engine ECU
233: transmission ECU
234: battery ECU
250: sensor
251: vehicle speed sensor
252: accelerator opening sensor
253: tilt angle sensor
254: rotation speed sensor
255: shift position sensor
256: engine rotation speed sensor
257: throttle opening sensor
258: battery temperature sensor
259: battery current sensor
271: MID
272: IVI
273: GNSS receiver
274: TCU
1200: computer
1210: host controller
1212: CPU
1214: RAM
1220: input/output controller
1222: communication interface
1230: ROM

What is claimed is:

1. A determination device comprising:

a management server processor, and a memory; wherein the memory is configured to acquire first degradation values that indicate respective degradation degrees of a plurality of components of a same type via an network; and the management server processor is configured to regard the respective first degradation values of the plurality of components as respective first usage values in a plurality of usage environments in which the plurality of components are used, store in the memory the first degradation values regarded as the first usage values;

determine, based on a target value that indicates a predetermined target degradation degree of the plurality of components, first combinations of the respective first degradation values of the plurality of components and the respective first usage values of the plurality of usage environments, wherein the management server processor is configured to determine, as the first combinations, combinations of the respective first degradation values of the plurality of components and the respective first usage values of the plurality of usage environments with a smallest number of sums of the first degradation values and the first usage values exceeding a first upper limit value that indicates a maximum degradation degree at which the plurality of components reach an end of a lifetime thereof, and wherein the management server processor is further configured to determine the first combination by performing:

a first process of determining whether the respective first degradation values of the plurality of components exceed the target value;

a second process of choosing, in order, for each component of the plurality of components a first degradation value of which exceeds the target value, usage environments by which each of the sums does not exceed the first upper limit value and an absolute value of a difference between each of the sums and the target value is smallest; and a third process of choosing, in order, for each component of the plurality of components the first degradation value of which is equal to or lower than the target value, usage environments by which each of the sums does not exceed the first upper limit value and an absolute value of a difference between each of the sums and the target value is smallest, from usage environments among the plurality of usage environments that are not chosen at the second process.

2. The determination device of claim 1, wherein the third process includes:

choosing, in order, combinations by which each of the sums does not exceed the first upper limit value and the absolute value of the difference between each of the sums and the target value is smallest, from combinations by which each of the sums exceeds the target value among combinations of respective components the first degradation value of which is equal to or lower than the target value and usage environments from the plurality of usage environments that are not chosen at the second process; and choosing, in order, combinations by which each of the sums does not exceed the first upper limit value and the absolute value of the difference between each of the sums and the target value is smallest, from combinations by which each of the sums is equal to or lower than the target value among combinations of the respective components the first degradation value of which is equal to or lower than the target value and usage environments from the plurality of usage environments that are not chosen at the second process.

3. The determination device of claim 2, wherein the target value includes a plurality of target values, and wherein the management server processor is configured to:

further perform the first process, the second process, and the third process in accordance with the plurality of target values having different values; and determine, as the first combinations, a combination of the respective components of the plurality of components and respective usage environments of the plurality of usage environments in accordance with a target value with a smallest number of the sums exceeding the first upper limit value that indicates the maximum degradation degree at which the plurality of components reach the end of the lifetime thereof, among combinations of the respective components of the plurality of components and the respective usage environments of the plurality of usage environments in accordance with the plurality of target values.

4. The determination device of claim 3, the management server processor is configured to:

determine tentative combinations of respective components of the plurality of components and respective usage environments of the plurality of usage environments by performing:

a first process of determining whether the respective first degradation values of the plurality of components exceed the target value, a second process of choosing, in order, for each component of the plurality of components a first degradation value of which exceeds the target value, usage environments by which each of the sums of the first degradation values and the first usage values does not exceed the first upper limit value and an absolute value of a difference between each of the sums and the target value is smallest, and a third process of choosing, in order, for each component of the plurality of components the first degradation value of which is equal to or lower than the target value, usage environments by which each of the sums does not exceed the first upper limit value and the absolute value of the difference between each of the sums and the target value is smallest, from usage environments among the plurality of usage environments that are not chosen at the second process; and determine the first combination by further repeating the first process, the second process, and the third process without determining, as the first combinations, combinations of the respective component and the respective usage environment by which each of sums of the second degradation values and the second usage values exceeds a second upper limit value that indicates a maximum degradation degree based on the second index at which the plurality of components reach the end of the lifetime thereof, among combinations of the respective components and the respective usage environment in the tentative combinations.

5. The determination device of claim 4, wherein each of the plurality of components includes a first constituent element and a second constituent element, wherein the first index depends on the first constituent element, wherein the second index depends on the second constituent element.

6. The determination device of claim 4, wherein the first index depends on a first environment element in an environment where the plurality of components are used, wherein the second index depends on a second environment element in the environment where the plurality of components are used.

7. The determination device of claim 1, wherein the first degradation values indicate degradation degrees based on a first index for each of the plurality of components, wherein the management server processor is configured to further acquire second degradation values that indicate degradation degrees based on a second index for each of the plurality of components, and regard the second degradation values as respective second usage values based on the second index in a plurality of usage environments in which the plurality of components are used, and determine the first combinations based further on the second degradation values and the second usage values.

8. The determination device of claim 7, wherein each of the plurality of components includes a first constituent element and a second constituent element, wherein the first index depends on the first constituent element, wherein the second index depends on the second constituent element.

9. The determination device of claim 7, wherein the first index depends on a first environment element in an environment where the plurality of components are used, wherein the second index depends on a second environment element in the environment where the plurality of components are used.

10. The determination device of claim 2, wherein the first degradation values are indicated in a percentage on a basis of a maximum degradation degree at which the plurality of components reach the end of the lifetime thereof.

11. The determination device of claim 1, wherein the target value includes a plurality of target values, and wherein the management server processor is configured to:

further perform the first process, the second process, and the third process in accordance with the plurality of target values having different values; and determine, as the first combinations, a combination of the respective components of the plurality of components and respective usage environments of the plurality of usage environments in accordance with a target value with a smallest number of the sums exceeding the first upper limit value that indicates the maximum degradation degree at which the plurality of components reach the end of the lifetime thereof, among combinations of the respective components of the plurality of components and the respective usage environments of the plurality of usage environments in accordance with the plurality of target values.

12. The determination device of claim 1, wherein the first degradation values are indicated in a percentage on a basis of a maximum degradation degree at which the plurality of components reach the end of the lifetime thereof.

13. The determination device of claim 1, wherein each of the plurality of components is a component mounted on a vehicle, wherein each of the plurality of usage environments is an owner of the vehicle or a user of the vehicle.

14. The determination device of claim 1, wherein a number of the plurality of components and a number of the plurality of usage environments match.

15. A determination device comprising:

a management server processor, and a memory; wherein the memory is configured to acquire first degradation values that indicate respective degradation degrees of a plurality of components of a same type via an network; and the management server processor is configured to regard the respective first degradation values of the plurality of components as respective first usage values in a plurality of usage environments in which the plurality of components are used, on a condition that a number of the plurality of components and a number of the plurality of usage environments match, store in the memory the first degradation values regarded as the first usage values, and determine, based on a target value that indicates a predetermined target degradation degree of the plurality of components, first combinations of the respective first degradation values of the plurality of components and the respective first usage values of the plurality of usage environments, wherein the management server processor is configured to determine, as the first combinations, combinations of the respective first degradation values of the plurality of components and the respective first usage values of the plurality of usage environments with a smallest number of sums of the first degradation values and the first usage values exceeding a first upper limit value that indicates a maximum degradation degree at which the plurality of components reach an end of a lifetime thereof.

* * * * *